United States Patent [19]

Hirama

[11] Patent Number: 5,528,642

[45] Date of Patent: Jun. 18, 1996

[54] SOLID-STATE IMAGING DEVICE WITH FAST CLOCK SPEED FOR IMPROVED IMAGE QUALITY

[75] Inventor: Masahide Hirama, Kanagawa, Japan

[73] Assignee: Sony Corporation, Tokyo, Japan

[21] Appl. No.: 404,947

[22] Filed: Mar. 15, 1995

Related U.S. Application Data

[63] Continuation of Ser. No. 182,500, Jan. 18, 1994, abandoned.

[30] Foreign Application Priority Data

Jan. 21, 1993 [JP] Japan .................... 5-008561
Jan. 21, 1993 [JP] Japan .................... 5-008562

[51] Int. Cl.$^6$ .................... G11C 19/28; H01L 27/148; H01L 29/768
[52] U.S. Cl. .................... 377/60; 257/234; 257/239; 257/248
[58] Field of Search .................... 257/234, 248, 257/239; 377/60

[56] References Cited

U.S. PATENT DOCUMENTS

| | | | |
|---|---|---|---|
| 4,540,901 | 9/1985 | Suzuki | 257/234 |
| 4,807,037 | 2/1989 | Iesaka et al. | |
| 4,985,760 | 1/1991 | Maeshima et al. | |
| 5,113,254 | 5/1992 | Kanno et al. | |

FOREIGN PATENT DOCUMENTS

| | | |
|---|---|---|
| 0242036 | 10/1987 | European Pat. Off. . |
| 0473966 | 3/1992 | European Pat. Off. . |
| 0553963 | 8/1993 | European Pat. Off. . |
| 59-99764 | 6/1984 | Japan ............ 257/234 |
| 1453341 | 10/1976 | United Kingdom ......... 257/234 |
| WO91/15079 | 10/1991 | WIPO . |

OTHER PUBLICATIONS

IEEE Spectrum vol. 10, No. 6, Jun. 1973, New York US p. 65 'New product applications: first commercial CCD unveiled, a 1×500–element image sensor' *figure 2*.

Primary Examiner—Gene M. Munson
Attorney, Agent, or Firm—William S. Frommer; Alvin Sinderbrand

[57] ABSTRACT

A CCD linear sensor as a solid-state imaging device has a photosensor and a pair of CCD registers connected to the photosensor. One of the CCD registers is supplied with first two-phase transfer clock signals for transferring electric charges from the photosensor to a first signal converter, and the other CCD register is supplied with second two-phase transfer clock signals for transferring electric charges from the photosensor to a second signal converter. The second two-phase transfer clock signals are shifted a ½ clock period from the first two-phase transfer clock signals. The CCD registers have the same number of dummy registers on their output ends for transferring the electric charges therethrough to the first and second signal converters, which convert the transferred electric charges into output signals that are in phase with each other. The periods of the output signals and the negative-going edges, i.e., the transitions, of reset pulses applied to the gates of FETS connected to the first and second signal converters are separate in time from each other, preventing coupling-induced noise from being included in the signal periods. The clock signals can thus be generated at a higher frequency and at a higher speed, making it possible to process the image signals at a higher frequency and at a higher speed.

4 Claims, 14 Drawing Sheets

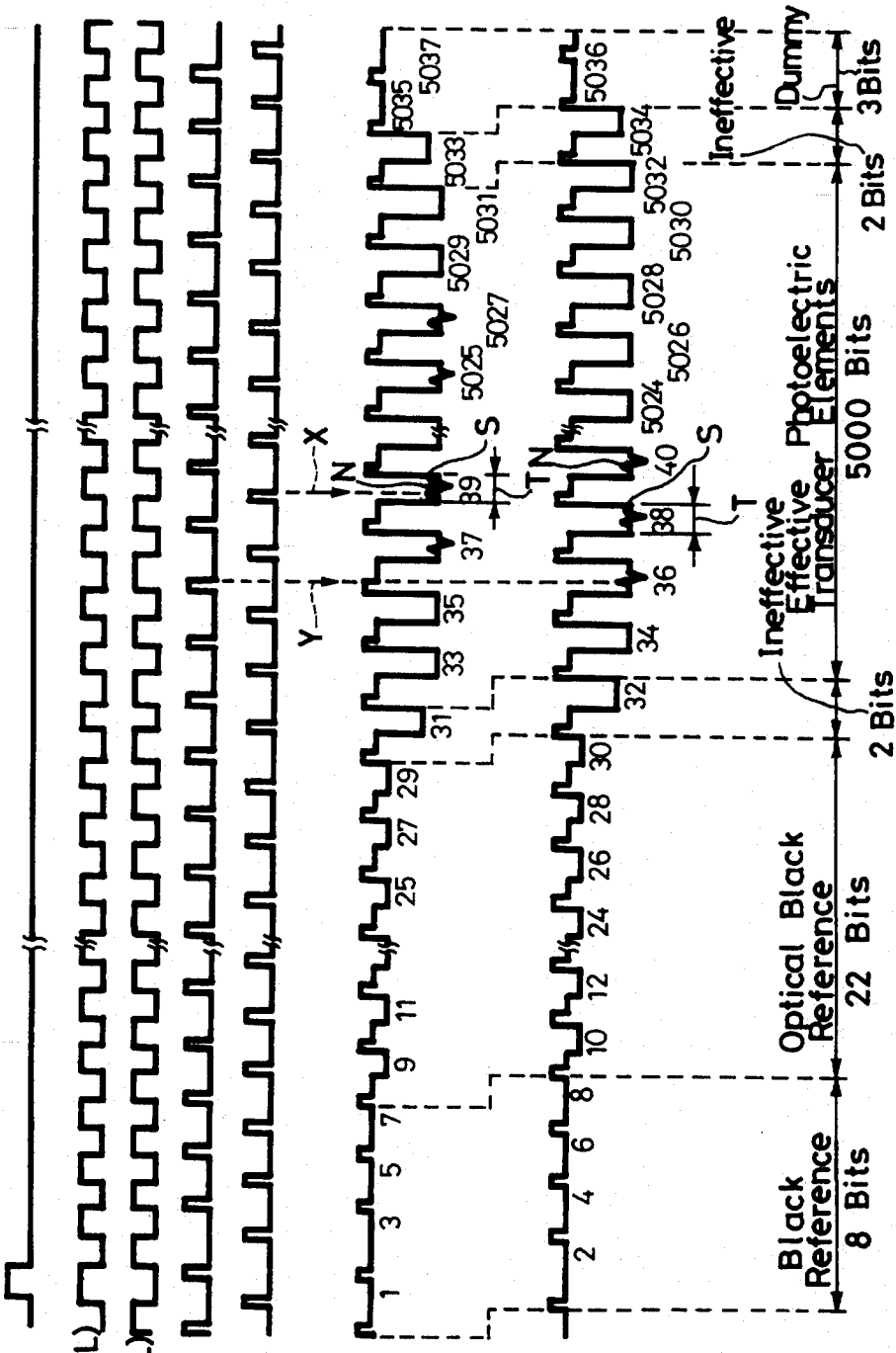

and speed of clock signals that are used. It is also necessary
SOLID-STATE IMAGING DEVICE WITH FAST CLOCK SPEED FOR IMPROVED IMAGE QUALITY This application is a continuation of application Ser. No. 08/182,500, filed Jan. 18, 1994, now abandoned.

BACKGROUND OF THE INVENTION

1. Field of the Invention

The present invention relates to a solid-state imaging device for use as a linear sensor comprising a linear array of photoelectric transducer elements or an area sensor comprising a three-dimensional matrix of photoelectric transducer elements.

2. Description of the Related Art

Heretofore, solid-state imaging devices, e.g., CCD (charge-coupled device) linear sensors, employ two-phase transfer clocks for transferring electric charges primarily because the driver circuit used is simple in arrangement and the two-phase transfer clocks are suitable for high-speed charge transfer.

FIG. 1A of the accompanying drawings shows a general structure of an IC-implemented CCD linear sensor 1 employing two-phase transfer clocks.

As shown in FIG. 1A, the CCD linear sensor 1 includes a photosensor 2 composed of a linear array of about 5000 photoelectric transducer elements. The odd-numbered photoelectric transducer elements PO (P1, P3, . . . ) of the photosensor 2 are connected through a readout gate electrode 4 to a CCD register $\alpha25$, and the even-numbered photoelectric transducer elements PE (P2, P4, . . . ) of the photosensor 2 are connected through the readout gate electrode 4 to a CCD register $\beta26$. The readout gate electrode 4 is connected to an input terminal 17 which supplies readout gate pulses $\phi TG$.

The CCD register $\alpha25$ comprises an array of registers which are connected alternately to an input terminal 18 which supplies a clock signal $\phi1$ and an input terminal 19 which supplies a clock signal $\phi2$. The final register on the output end of the CCD register $\alpha25$ is connected to an input terminal 20 which supplies a clock signal $\phi2L$. Signal charges are transferred to a floating diffusion region 3 of the CCD register $\alpha25$. The floating diffusion region 3 has an output terminal connected through a buffer 8 to an output terminal 22 where a signal V1 appears.

The CCD register $\beta26$ comprises an array of registers which are connected alternately to an input terminal 16 which supplies a clock signal $\phi1$ and an input terminal 15 which supplies a clock signal $\phi2$. The final register on the output end of the CCD register $\beta26$ is connected to an input terminal 14 which supplies a clock signal $\phi1L$. Signal charges are transferred to a floating diffusion region 5 of the CCD register $\beta26$. The floating diffusion region 5 has an output terminal connected through a buffer 9 to an output terminal 12 where a signal V2 appears.

The floating diffusion regions 3, 5 are also connected to the sources of respective FETs (field-effect transistors) 6, 7. The FETs 6, 7 have respective gates, i.e., reset gates, connected to input terminals 21, 13, respectively, which supply reset gate pulses (also referred to as reset gate clock pulses) $\phi R1$, $\phi R2$. The FETs 6, 7 have respective drains connected to a common input terminal 11 which supplies a power supply voltage $V_{DD}$.

Operation of the CCD linear sensor 1 shown in FIG. 1A will be described below.

FIGS. 2A through 2H are timing charts illustrative of the manner in which the CCD linear sensor 1 shown in FIG. 1A operates.

When a readout gate pulse $\phi TG$ shown in FIG. 2A which corresponds to a line clock signal is supplied through the input terminal 17 to the readout gate electrode 4, electric charges stored in the photoelectric transducer elements PO, PE of the photosensor 2 are transferred at once to the CCD registers $\alpha25$, $\beta26$, respectively.

Then, when two-phase transfer clock signals $\phi1$ ($\phi1L$), $\phi2$ ($\phi2L$) shown in FIGS. 2B and 2C are supplied to the registers of the CCD registers $\alpha25$, $\beta26$ through the input terminals 18, 16, 14 and the input terminals 19, 15, 20, the electric charges that have been transferred from the photosensor 2 to the registers of the CCD registers ($\alpha25$, $\beta26$ are successively transferred to the output ends thereof. The electric charges are transferred to the floating diffusion regions 3, 5 and converted thereby into respective voltage signals, which are supplied as output signals V1, V2 in opposite phase with each other (see FIGS. 2F and 2G) through the respective buffers 8, 9 to the respective output terminals 22, 12.

After the electric charges have been converted into voltage signals by the floating diffusion regions 3, 5, any remaining electric charges in the floating diffusion regions 3, 5 are drained to the common input terminal 11 through the FETs 6, 7 in response to reset gate pulses $\phi R1$, $\phi R2$ (see FIGS. 2D and 2E) that are applied from the input terminals 21, 13 to the gates of the FETs 6, 7.

As can be understood from FIGS. 2H, 2F, and 2G, the CCD linear sensor 1 has 8-bit photoelectric transducer elements P1–P8 for a black reference on its output end, 22-bit photoelectric transducer elements P9–P30 for an optical black reference, 2-bit ineffective photoelectric transducer elements P31, P32, 5000-bit effective photoelectric transducer elements P33–P5032, 2-bit ineffective photoelectric transducer elements P5033, P5034, and 3-bit dummy photoelectric transducer elements P5035–P5037.

Each of the output signals V1, V2 produced by the CCD linear sensor 1 includes low levels, referred to as signals S, that correspond respectively to the effective photoelectric transducer elements P33–P5032 of the CCD linear sensor 1. The period of each of the signals S is referred to as a signal period T.

FIG. 3 of the accompanying drawings illustrates a CCD linear sensor 31 and a signal processing circuit 30 connected thereto, the CCD linear sensor 31 being identical to the CCD linear sensor 1 shown in FIG. 1A;

In FIG. 3, signals S of output signals V1, V2 from the CCD linear sensor 31 are sampled and held by respective sample and hold circuits 34, 35 connected respectively to output terminals 32, 33 of the CCD linear sensor 30 in response to sample and hold pulses SH1, SH2 that are supplied in opposite phase with each other from respective terminals 36, 37 to the sample and hold circuits 34, 35. Thereafter, the sampled and held signals S are converted by a common analog-to-digital (A/D) converter 38 connected to the sample and hold circuits 34, 35 into a digital signal, which is then supplied to an output terminal 39 for use by an external device.

In applications using solid-state imaging devices such as CCD linear sensors, it is often indispensable to achieve real-time signal processing and high image quality.

To meet real-time signal processing requirements, solid-state imaging devices are required to increase the frequency and speed of clock signals that are used. It is also necessary that the signal S contain low noise in order to satisfy requirements for high image quality.

As can be seen from FIGS. 1A and 2A through 2H, the clock signals that are required to output the signal V1 include the pulses φTG, φ1, φ2 (φ2L), φR1, but not the pulses φ1L, φR2, and no pulses φ2L, φR1 are required to output the signal V2.

The reset gate pulses φR1, φR2 are generated at such timing that they pose a problem with regard to meeting requirements for high image quality.

More specifically, as shown in FIGS. 2E and 2F, each of the reset gate pulses φR2 which are not required to output the signal V1 has a negative-going edge (see the arrow indicated by X) in the signal period T of a signal S of the output signal V1, and as shown in FIGS. 2D and 2G, each of the reset gate pulses φR1 which are not required to output the signal V2 has a negative-going edge (see the arrow indicated by Y) in the signal period T of a signal S of the output signal V1.

The negative-going edges of the reset gate pulses φR1, φR2 cause coupling-induced noise, i.e., noise N due to a clock overlap, in the signals S, which thus have a non-flat irregular waveform.

If the clock frequency is relatively low, then those periods of the signals S which suffer the noise N, i.e., suffer level fluctuations due to the contained noise N, and those signal periods which do not suffer such level fluctuations are spaced in time from each other. When the sampling timing (the sample and hold pulses SH1, SH2) of the sample and hold circuits 34, 35 is brought into conformity with the signal periods which do not suffer level fluctuations, no noise N is contained in the signals that have been sampled and held.

However, if the clock signals are supplied at a higher frequency and at a higher speed, the waveform of the signals S is caused to fluctuate in all the signal periods T thereof due to the noise N. At this time, inasmuch as the signals S have to be sampled and held during the signal periods T in which the signal waveform is fluctuating, the noise N is necessarily contained in the signals that have been sampled and held. As a result, it is impossible to achieve high image quality with such sampled signals S.

OBJECT AND SUMMARY OF THE INVENTION

It is an object of the present invention to provide a solid-state imaging device which is operable with clock signals at a higher frequency and at a higher speed and is capable of producing output signals with minimum noise contained in their periods.

According to the present invention, there is provided a solid-state imaging device comprising a photosensor having a plurality of photoelectric transducer elements, a first signal converter, a first charge transfer device connected between the photosensor and the first signal converter, for transferring electric charges from odd-numbered photoelectric transducer elements of the photosensor to the first charge transfer device in response to first two-phase transfer clock signals which are in opposite phase with each other, a second signal converter, a second charge transfer device connected between the photosensor and the second signal converter, for transferring electric charges from even-numbered photoelectric transducer elements of the photosensor to the second charge transfer device in response to second two-phase transfer clock signals which are in opposite phase with each other, and means for shifting either one of the first and second two-phase transfer clock signals from the other by a ½ clock period to allow the first and second signal converters to produce output signals which are in phase with each other.

According to the present invention, there is also provided a solid-state imaging device comprising a photosensor having a plurality of photoelectric transducer elements, a first charge transfer device having first dummy charge transfer elements on an output end thereof, for transferring electric charges supplied from odd-numbered photoelectric transducer elements of the photosensor to the first dummy charge transfer elements, a second charge transfer device having as many second dummy charge transfer elements on an output end thereof as the number of the first dummy charge transfer elements, for transferring electric charges supplied from even-numbered photoelectric transducer elements of the photosensor to the second dummy charge transfer elements, a first signal converter for converting the electric charges supplied from the first dummy charge transfer elements into a first output signal, and a second signal converter for converting the electric charges supplied from the second dummy charge transfer elements into a second output signal which is in phase with the first output signal.

Specifically, each of the first and second charge transfer devices may have three dummy charge transfer elements.

The first and second dummy charge transfer elements may comprise charge transfer elements for providing a black reference.

Since the output signals are in phase with each other, the periods of the output signals and the negative-going edges, i.e., the transitions, of reset pulses applied to the gates of FETs connected to the first and second signal converters are separate in time from each other, preventing coupling-induced noise from being included in the signal periods. The clock signals can thus be generated at a higher frequency and at a higher speed, making it possible to process the image signals at a higher frequency and at a higher speed.

Therefore, the signal waveforms during the signal periods are rendered flat. When the flat signal waveforms are sampled and held, the sampled and held signals are free of noise. Accordingly, images, for example, produced by processing the noise-free signals are of high quality. Only one type of sample and hold pulses may be employed.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 2A through 2H are timing charts illustrative of the manner in which the CCD linear sensor shown in FIG. 1A operates;

DETAILED DESCRIPTION OF THE PREFERRED EMBODIMENTS

A CCD linear sensor as a solid-state imaging device according to a first embodiment of the present invention will first be described below with reference to FIGS. 4 through 6A–6K.

Figure 4:
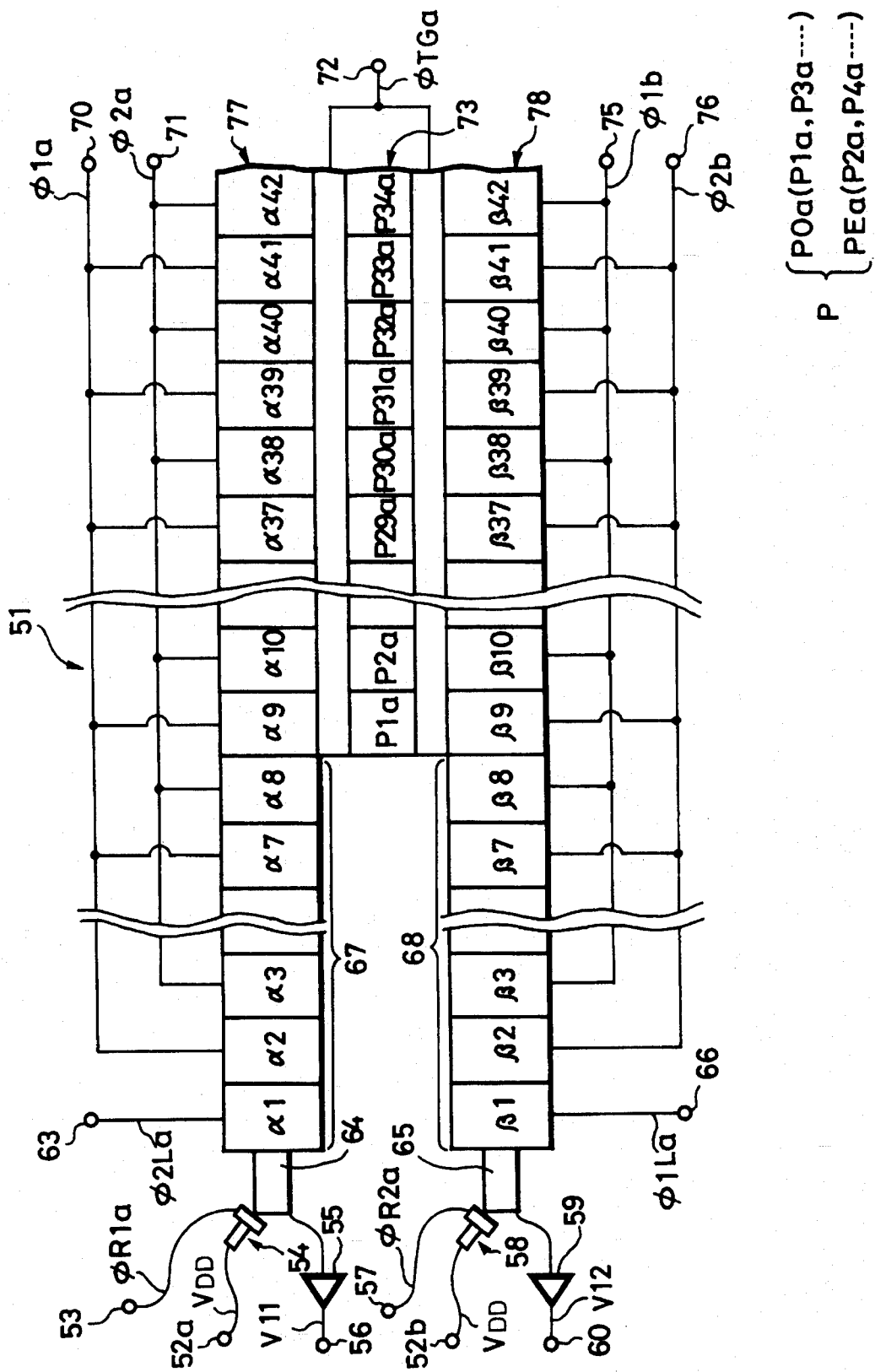
FIG. 4 is a fragmentary block diagram of a CCD linear sensor as a solid-state imaging device according to a first embodiment of the present invention.
Figure 5:
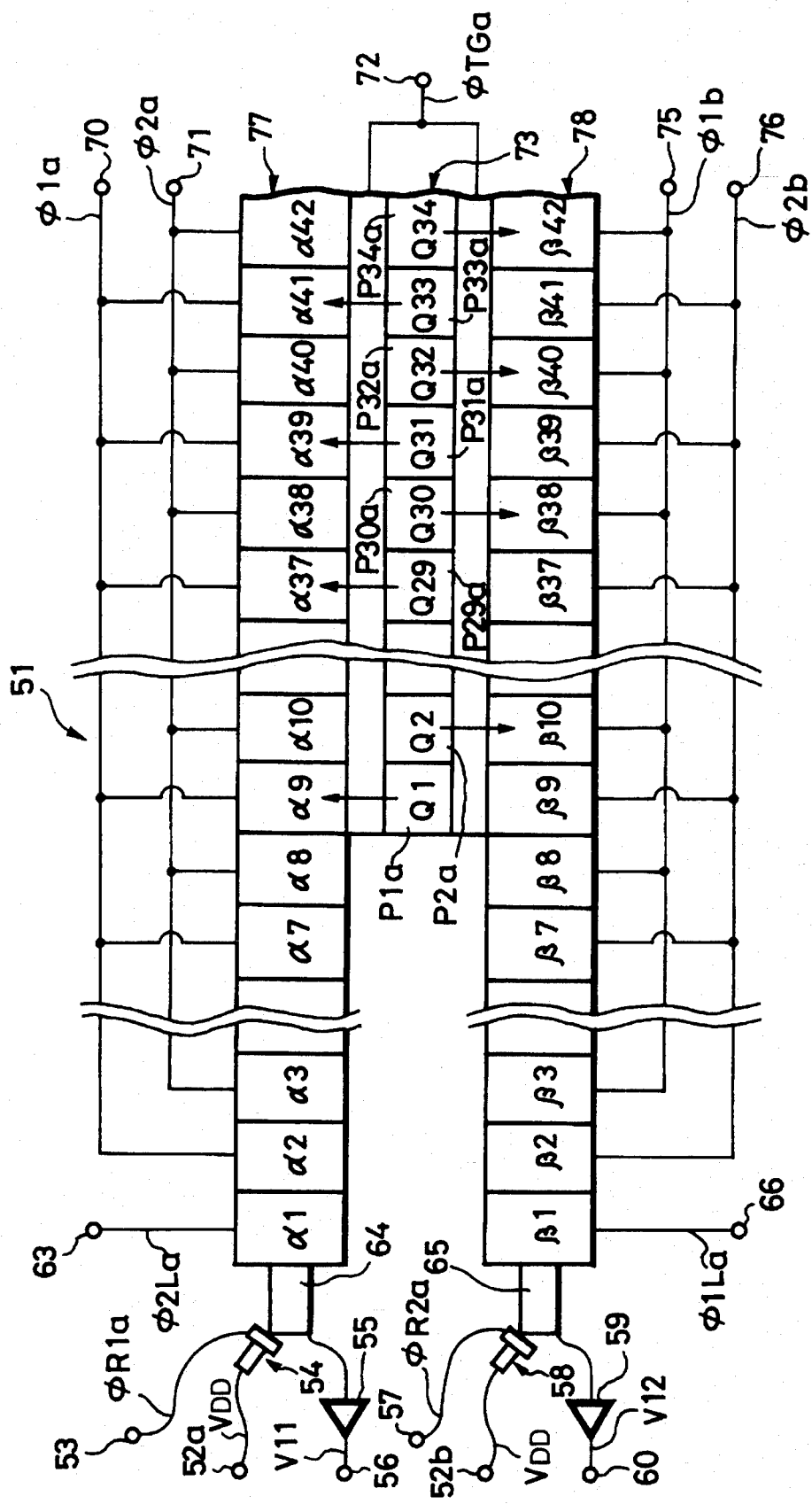
FIG. 5 is a fragmentary block diagram illustrative of the manner in which the CCD linear sensor shown in FIG. 4 operates.
Figure 6:
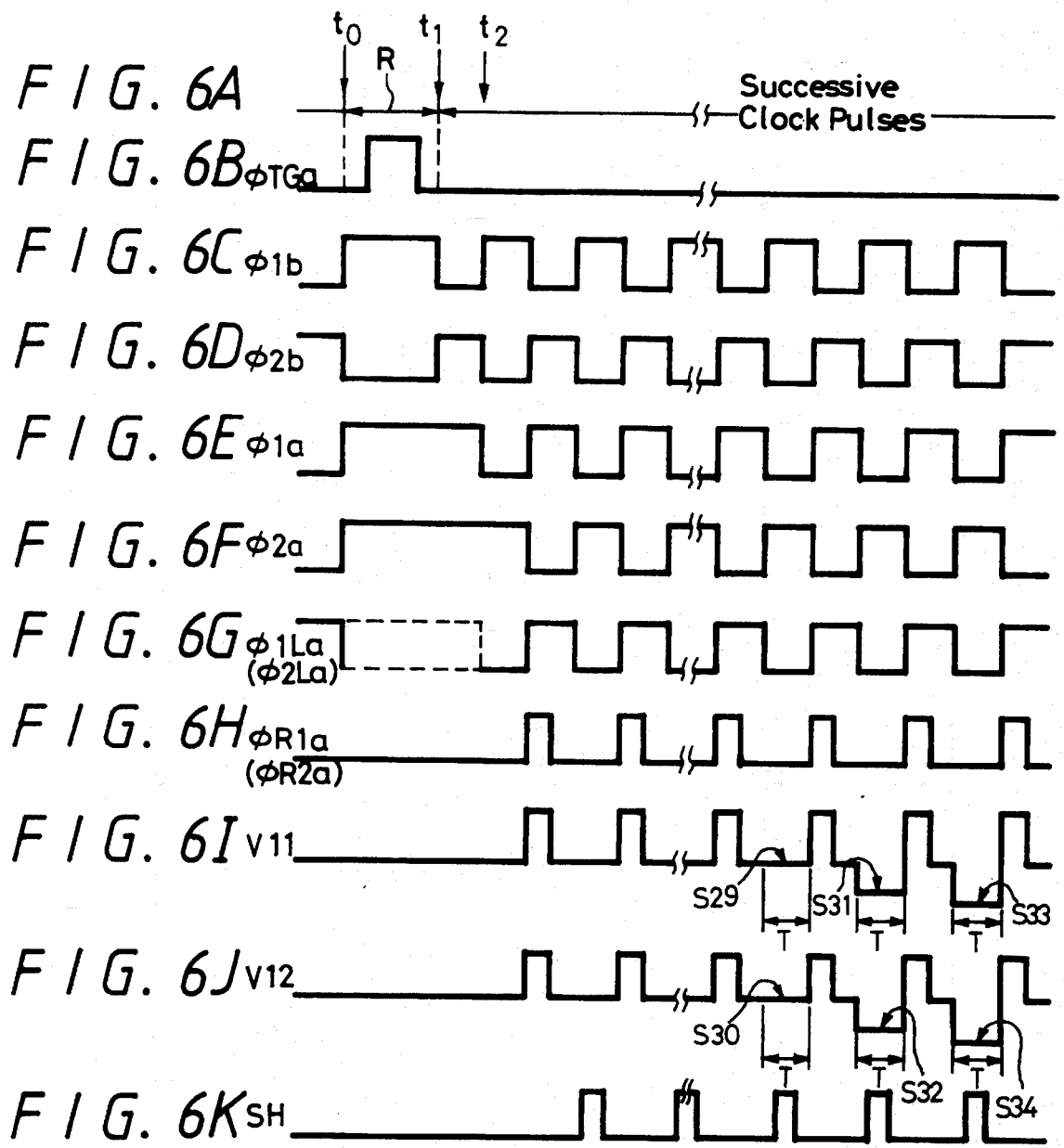
FIGS. 6A through 6K are timing charts illustrative of the manner in which the CCD linear sensor shown in FIG. 4 operates.

FIG. 4 fragmentarily shows, in block form, a solid-state imaging device according to a first embodiment of the present invention, which is embodied as a CCD linear sensor, generally designated by the reference numeral 51.

As shown in FIG. 4, the CCD linear sensor 51 has a photosensor 73 comprising a linear array of about 5000 photoelectric transducer elements P (POa, PEa). The odd-numbered photoelectric transducer elements POa (P1a, P3a, ...) of the photosensor 73 are connected through a readout gate electrode to a CCD register α77 that serves as a first charge transfer device. The CCD register α77 comprises a linear array of registers α1, α2, ...

The even-numbered photoelectric transducer elements PEa (P2a, P4a, ...) of the photosensor 73 are connected through the readout gate electrode to a CCD register β78 that serves as a second charge transfer device. The CCD register β78 comprises a linear array of registers β1, β2, ...

The readout gate electrode is connected to an input terminal 72 which supplies readout gate pulses φTG. The photoelectric transducer elements P1a–P30a of the photosensor 73 are elements for providing an optical black reference. The photoelectric transducer elements P31a, P32a are ineffective photoelectric transducer elements. The photoelectric transducer elements P33a–P5032a (not shown) are effective photoelectric transducer elements.

The 8 registers α1–α8 on an output end of the CCD register α77 are dummy registers (also referred to as dummy bits) 67. The 8 registers β1–β8 on an output end of the CCD register β78 are also dummy registers 68. These dummy registers 67, 68 are not connected through the readout gate electrode to any photoelectric transducer elements of the photosensor 73, and serve to provide a black reference.

The registers α2, α3, ... of the CCD register α77 are connected alternately to an input terminal 70 which supplies a clock signal φ1a and an input terminal 71 which supplies a clock signal φ2a. The clock signals φ1a, φ2a serve as first two-phase clock signals that are in opposite phase with each other. The final register α1 on the output end of the CCD register α77 is connected to an input terminal 63 which supplies a clock signal φ2La and also to a floating diffusion region (FD) 64 that serves as a first signal converter. The floating diffusion region 64 has an output terminal connected through a buffer 55 to an output terminal 56 where a signal V11 appears.

Similarly, the registers β2, β3, ... of the CCD register β78 are connected alternately to an input terminal 76 which supplies a clock signal φ2b and an input terminal 75 which supplies a clock signal φ1b. The clock signals φ1b, φ2b serve as second two-phase clock signals that are in opposite phase with each other. The final register β1 on the output end of the CCD register β78 is connected to an input terminal 66 which supplies a clock signal φ1La and also to a floating diffusion region (FD) 65 that serves as a second signal converter. The floating diffusion region 65 has an output terminal connected through a buffer 59 to an output terminal 60 where a signal V12 appears.

The output terminals of the floating diffusion regions 64, 65 are connected to the sources of respective FETs 54, 58. The FETs 54, 58 have respective gates, i.e., reset gates, connected respectively to input terminals 53, 57 which supply reset gate pulses (also referred to as reset gate clock pulses) φR1a, φR2a. Since the reset gate pulses φR1a, φR2a that are supplied through the input terminals 53, 57 are the same as each other, the input terminals 53, 57 may be connected in common to each other. The FETs 54, 58 have respective drains, i.e., reset drains, connected to respective input terminals 52a, 52b which supply a power supply voltage $V_{DD}$. The input terminals 52a, 52b are actually connected in common to each other.

Operation of the CCD linear sensor 51 shown in FIG. 4 will be described below with reference to FIGS. 5 and 6A–6K.

When a readout gate pulse φTGa corresponding to a line clock signal shown in FIG. 6A is supplied through the input terminal 72 to the readout gate electrode in a readout period R from a time t0 to a time t1, electric charges Q1, Q2, ... (see FIG. 5) stored in the photoelectric transducer elements P (POa=P1a, P3a, ..., PEa=P2a, P4a, ...) of the photosensor 73 are transferred at once to the corresponding registers of the CCD registers α77, β78 as indicated by the arrows.

More specifically, the electric charges Q1, Q3, ..., Q29, Q31, ... stored in the odd-numbered photoelectric transducer elements P1a, P3a, ..., P29a, P31a, ... are transferred respectively to the registers α9, α11, ..., α37, α39, ... that are supplied with the clock signal φ1a which is of a high level. The electric charges Q2, Q4, ..., Q30, Q32, ... stored in the even-numbered photoelectric transducer elements P2a, P4a, ..., P30a, P32a, ... are transferred respectively to the registers β10, β12, ..., β38, β40, ... that are supplied with the clock signal φ1b which is of a high level.

When the clock signal φ1b is of a low level and the clock signal φ2b is of a high level in a period t1–t2, the electric charges Q stored in the registers of the CCD register β78 are transferred one register downstream. That is, the electric charges Q2, ..., Q30, Q32, ... stored in the registers β10, β12, ..., β38, β40, ... are transferred to the registers β9, ..., β37, β39, .... Since the clock signals φ1a, φ1b supplied to the CCD register α77 remain unchanged in level during the period t1–t2, no charges are transferred in the CCD register α77.

After the time t2, the transfer clock signals φ1a, φ2a that are in opposite phase with each other which are supplied to the CCD register α77 start being repeatedly inverted to transfer sets of electric charges Q1, Q2, electric charges Q3, Q4, . . . , electric charges Q31, Q32, electric charges Q33, Q34, . . . that are in phase with each other successively from the CCD registers α77, β78 to the floating diffusion regions 64, 65 at successive times.

The transferred electric charges are converted by the floating diffusion regions 64, 65 into voltage signals, which are then sent through the buffers 55, 58 as two-phase output signals V11, V12 (see FIGS. 6I and 6J) that are in phase with each other to the respective output terminals 56, 60. In FIGS. 6I and 6J, the signals which correspond to the electric charges Q29–Q34 are indicated by S29–S34, respectively.

When the reset gate pulses φR1a, φR2a, which are identical with each other, as shown in FIG. 6H, are supplied from the input terminals 53, 57 to the gates of the respective FETs 54, 58, any electric charges that remain in the floating diffusion regions 64, 65 after the transferred electric charges are converted by the floating diffusion regions 64, 65 into voltage signals are drained from the drains of the FETs 54, 58 to the input terminals 52a, 52b.

As can be understood from FIGS. 6A through 6K, the reset gate pulses φR1a, φR2a may be generated between charge transfers, i.e., between a signal period T and a next signal period T (see FIGS. 6I and 6J, for example). Therefore, the transitions, i.e., the negative-going edges of the reset gate pulses φR1a, φR2a are located outside of the signal periods T. No noise caused due to the transitions of the reset gate pulses φR1a, φR2a are thus included in the signal periods T. Consequently, even if the clock signals have a shorter period, i.e., are generated at a higher frequency and at a higher speed, no noise is produced in the signal periods T of the output signals V11, V12.

Figure 7:
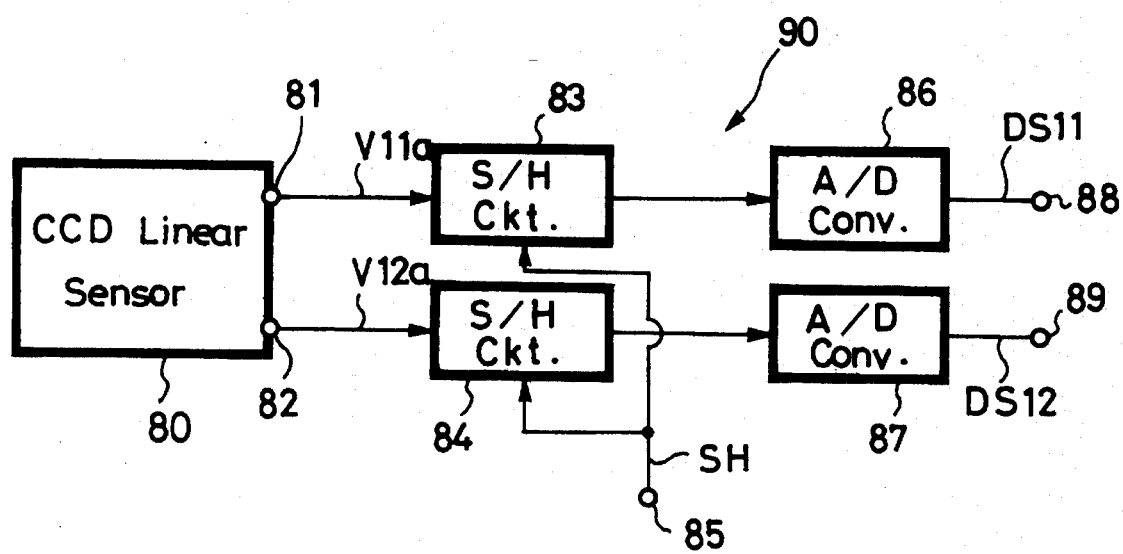
FIG. 7 is a block diagram of a CCD linear sensor as a solid-state imaging device and a signal processing circuit connected thereto according to a second embodiment of the present invention.

FIG. 7 shows in block form a CCD linear sensor 80 as a solid-state imaging device and a signal processing circuit 90 connected thereto according to a second embodiment of the present invention. The CCD linear sensor 80 is identical to the CCD linear sensor 51 shown in FIG. 4.

In FIG. 7, output signals V11a, V12a including signals S having signal periods T are supplied from respective output terminals 81, 82 of the CCD linear sensor 80 to respective sample and hold circuits 83, 84. The output signals V11a, V12a supplied to the sample and hold circuits 83, 84 are sampled and held thereby in response to common sample and hold pulses SH that are supplied from a terminal 85. The sampled and held signals are then converted into respective digital signals DS11, DS12 by respective A/D converters 86, 87 that are connected to the output terminals of the respective sample and hold circuits 83, 84. The digital signals DS11, DS12 are then supplied to respective output terminals 88, 89 for use by an external device. The circuit arrangement shown in FIG. 7 is capable of processing parallel signals at a higher frequency and at a higher speed than the conventional arrangement.

In the first and second embodiments, the second two-phase transfer clock signals φ1b, φ2b supplied to the CCD register β78 are shifted a ½ clock period from the first two-phase transfer clock signals φ1a, φ2a supplied to the CCD register α77. Heretofore, the same two-phase transfer clock signals φ1, φ2 have been supplied to the CCD registers α25, β26. According to the present invention, therefore, the floating diffusion regions 64, 65 can output the signals V11, V12 that are in phase with each other.

Inasmuch as the output signals V11, V12 are in phase with each other, the signal periods and the negativegoing edges, i.e., the transitions, of the clock pulses (reset gate pulses φR1a, φR2a) are separate in time from each other, preventing coupling-induced noise from being included in the signal periods. Therefore, the clock signals can be generated at a higher frequency and at a higher speed, making it possible to process the image signals at a higher frequency and at a higher speed.

As a result, the signal waveforms during the signal periods T are rendered flat. When the flat signal waveforms are sampled and held, the sampled and held signals are free of noise. Accordingly, images, for example, produced by processing the noise-free signals are of high quality. As shown in FIG. 7, only one type of sample and hold pulses SH may be employed, and the timing for sampling and holding the signals can easily be adjusted.

Figure 1A:
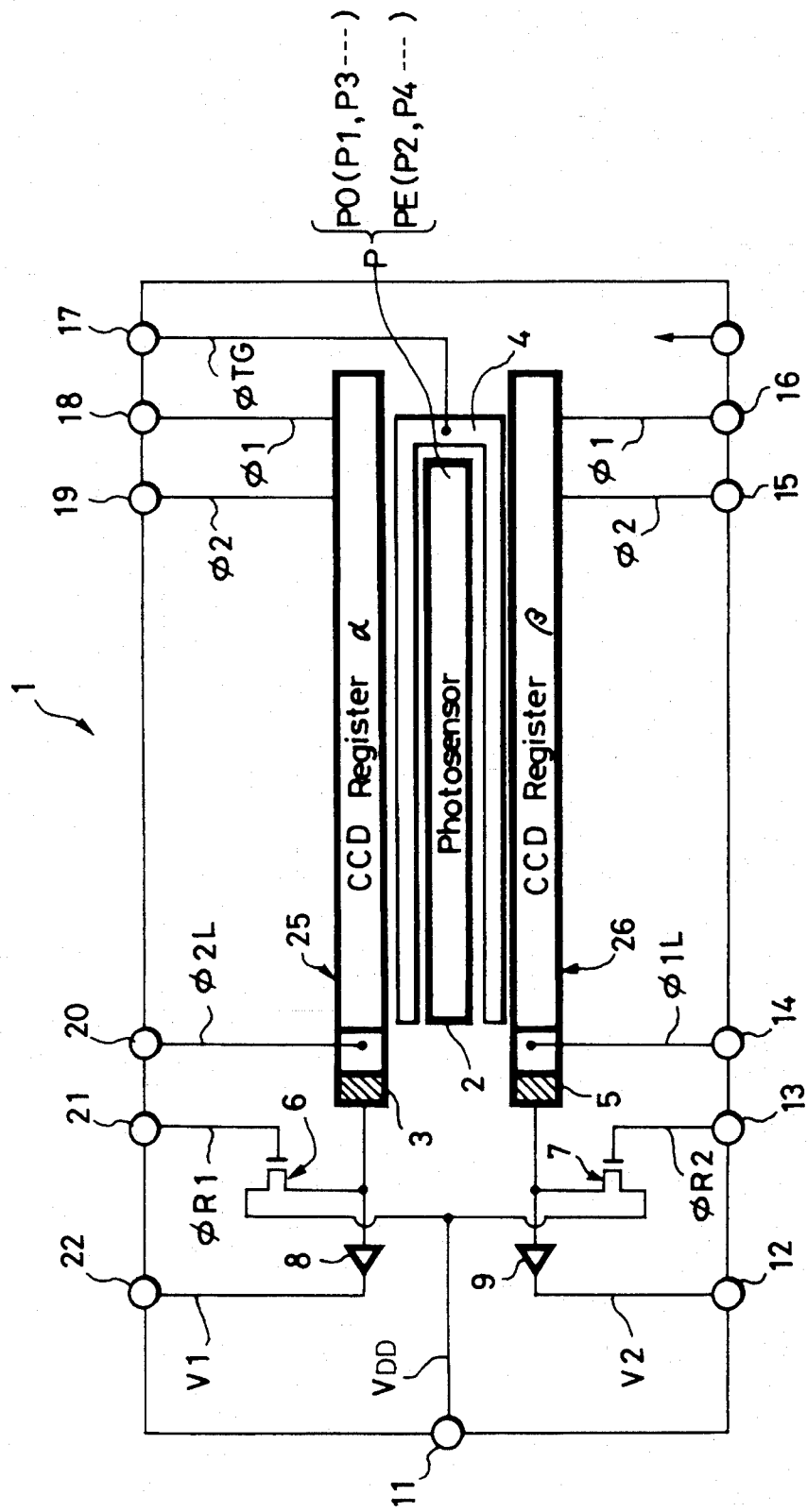
FIGS. 1A and 1B are block diagrams of CCD linear sensors of the related art.
Figure 8:
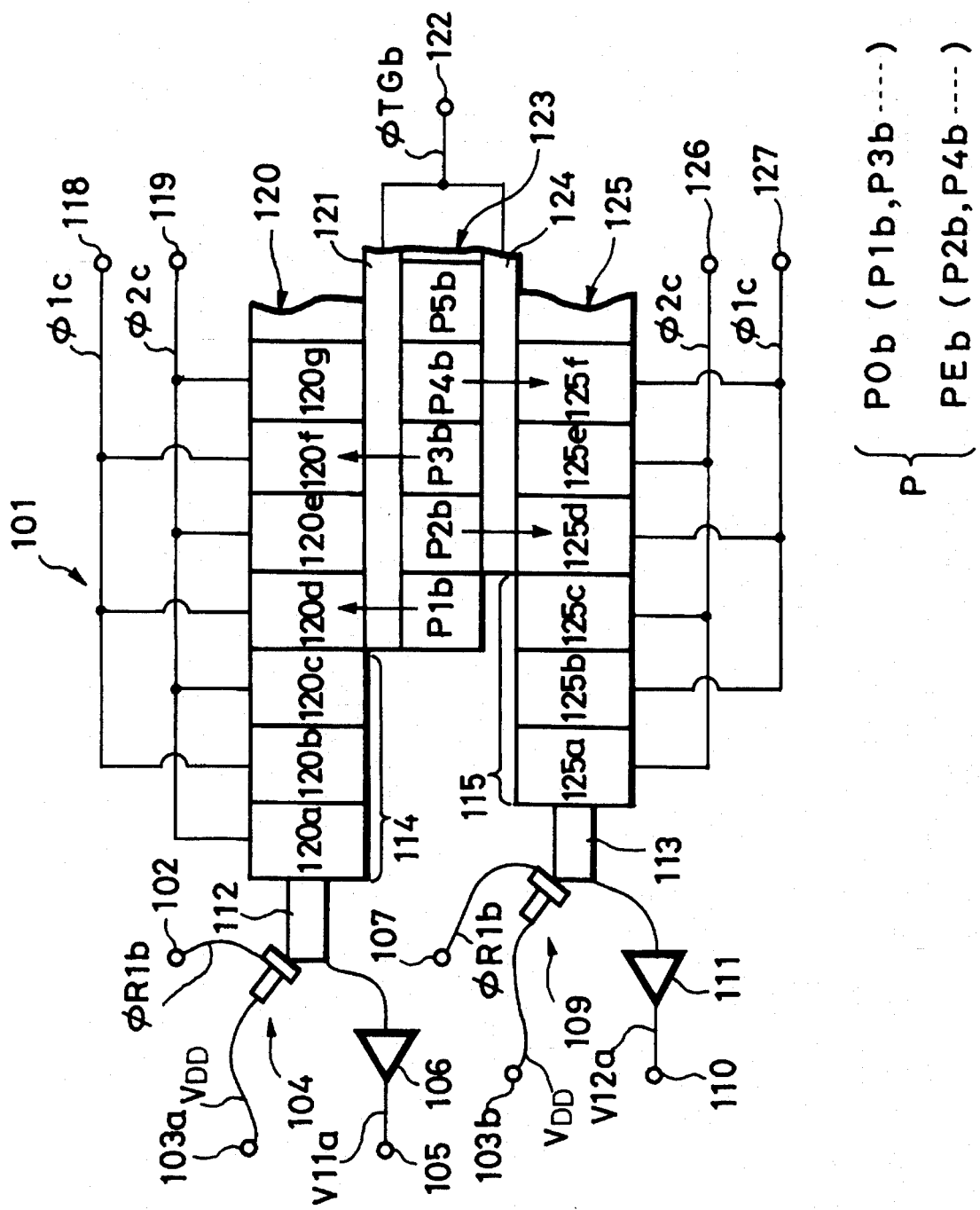
FIG. 8 is a fragmentary block diagram of a CCD linear sensor as a solid-state imaging device according to a third embodiment of the present invention.

FIG. 8 shows a CCD linear sensor as a solid-state imaging device according to a third embodiment of the present invention. The CCD linear sensor, generally designated by the reference numeral 101 in FIG. 8, is similar in arrangement to the CCD linear sensor 1 of the related art shown in FIG. 1A.

As shown in FIG. 8, the CCD linear sensor 101 has a photosensor 123 comprising a linear array of about 5000 photoelectric transducer elements P (POb, PEb). The odd-numbered photoelectric transducer elements POb (P1b, P3b, ...) of the photosensor 123 are connected through a readout gate electrode to a CCD register 120 that serves as a first charge transfer device. The CCD register 120 comprises a linear array of registers 120b, 120c, .... The even-numbered photoelectric transducer elements PEb (P2b, P4b, ...) of the photosensor 123 are connected through the readout gate electrode to a CCD register 125 that serves as a second charge transfer device. The readout gate electrode is connected to an input terminal 122 which supplies readout gate pulses φTG. The CCD register 122 comprises a linear array of registers 125a, 125b, ....

The 3 registers (also referred to as 3 bits) 120a, 120b, 120c on an output end of the CCD register 120 are dummy registers (also referred to as dummy bits) 114 as a first dummy charge transfer device. The 3 registers 125a, 125b, 125c on an output end of the CCD register 125 are also dummy registers 115 as a second dummy charge transfer device. In this embodiment, the numbers of dummy registers 114, 115 on the output ends of the CCD registers 120, 125 are the same as each other. The dummy registers 114, 115 are not connected through the readout gate electrode to any photoelectric transducer elements P of the photosensor 123, and serve to provide a black reference.

The registers 120a, 120b, ... of the CCD register 120 are connected alternately to an input terminal 119 which supplies a clock signal φ2c and an input terminal 118 which supplies a clock signal φ1c. The final register 120a on the output end of the CCD register 120 is connected to a floating diffusion region (FD) 112 that serves as a first signal converter. The floating diffusion region 112 has an output terminal connected through a buffer 106 to an output terminal 105 where a signal V11a appears.

Similarly, the registers 125a, 125b, ... of the CCD register 125 are connected alternately to an input terminal 126 which supplies a clock signal φ2c and an input terminal 127 which supplies a clock signal φ1c. The final register 125a on the output end of the CCD register 125 is connected to a floating diffusion region (FD) 113 that serves as a second signal converter. The floating diffusion region 113 has an output terminal connected through a buffer 111 to an output terminal 110 where a signal V12a appears.

The output terminals of the floating diffusion regions 112, 113 are connected to the sources of respective FETs 104, 109. The FETs 104, 109 have respective gates, i.e., reset gates, connected respectively to input terminals 102, 107 which supply reset gate pulses (also referred to as reset gate clock pulses) $\phi R1b$. Since the same reset gate pulses $\phi R1b$ are supplied through the input terminals 102, 107, the input terminals 102, 107 may be connected in common to each other. The FETs 102, 107 have respective drains, i.e., reset drains, connected to respective input terminals 103a, 103b which supply a power supply voltage $V_{DD}$. The input terminals 103a, 103b are actually connected in common to each other.

Figure 1B:
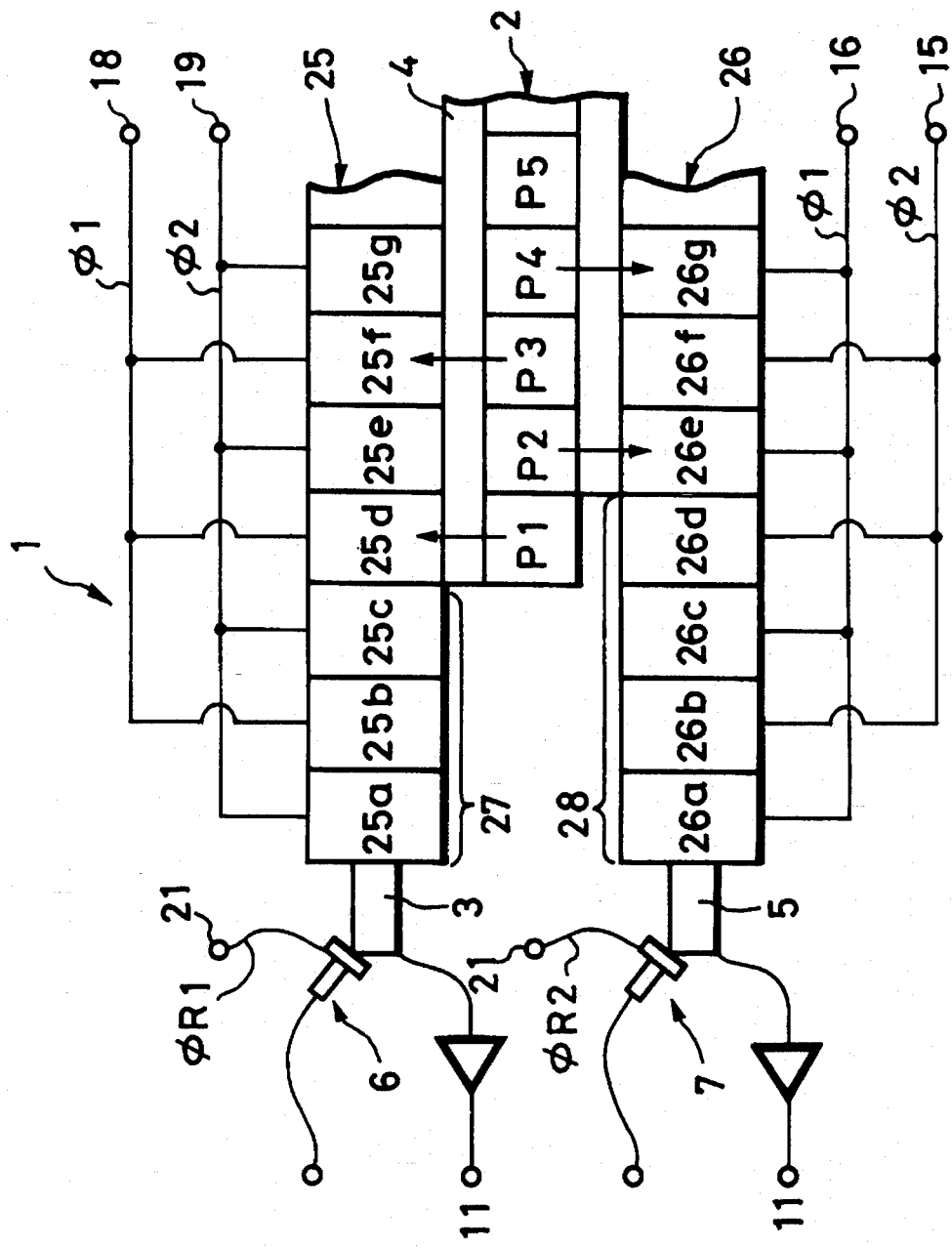
Figure 3:
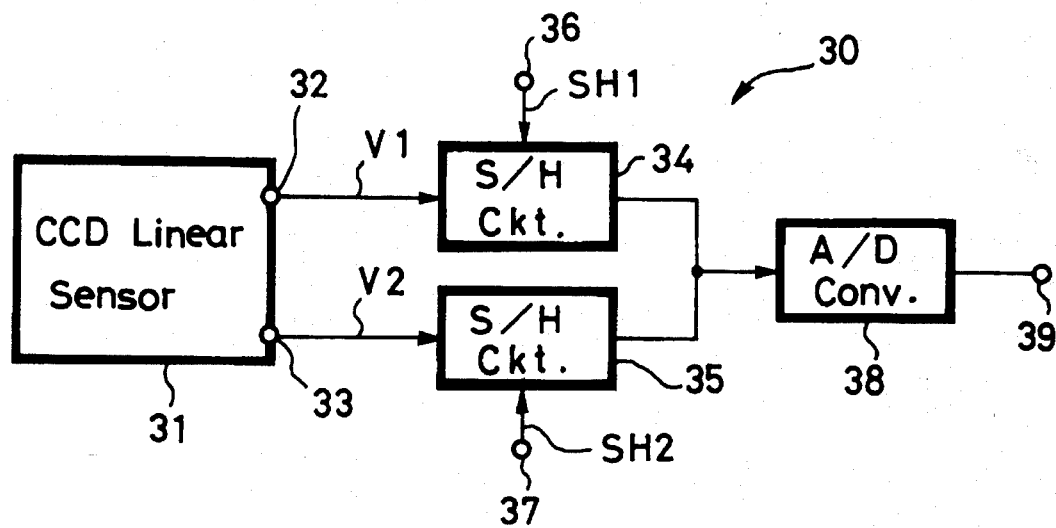
FIG. 3 is a block diagram of the CCD linear sensor shown in FIG. 1A and a signal processing circuit connected thereto.

FIG. 1B shows a CCD linear sensor 1 as a solidstate imaging device which is illustrated as a comparative example used to indicate clearly the difference between the CCD linear sensor 101 shown in FIG. 8 and the related art.

The CCD linear sensor 101 shown in FIG. 8 and the CCD linear sensor 1 shown in FIG. 1B differ from each other in that the CCD register 125 shown in FIG. 8 has 3 dummy registers 115 whereas a CCD register 26 shown in FIG. 1B has dummy registers 28 which comprise four registers 26a, 26b, 26c, 26d, and input terminals 21 connected to the gates of respective FETs 6, 7 shown in FIG. 1B are supplied with respective reset gate pulses $\phi R1$, $\phi R2$ that are in opposite phase with each other. Therefore, the numbers of dummy registers 27, 28 in the CCD linear sensor 1 shown in FIG. 1B are not the same as each other.

Figure 9:
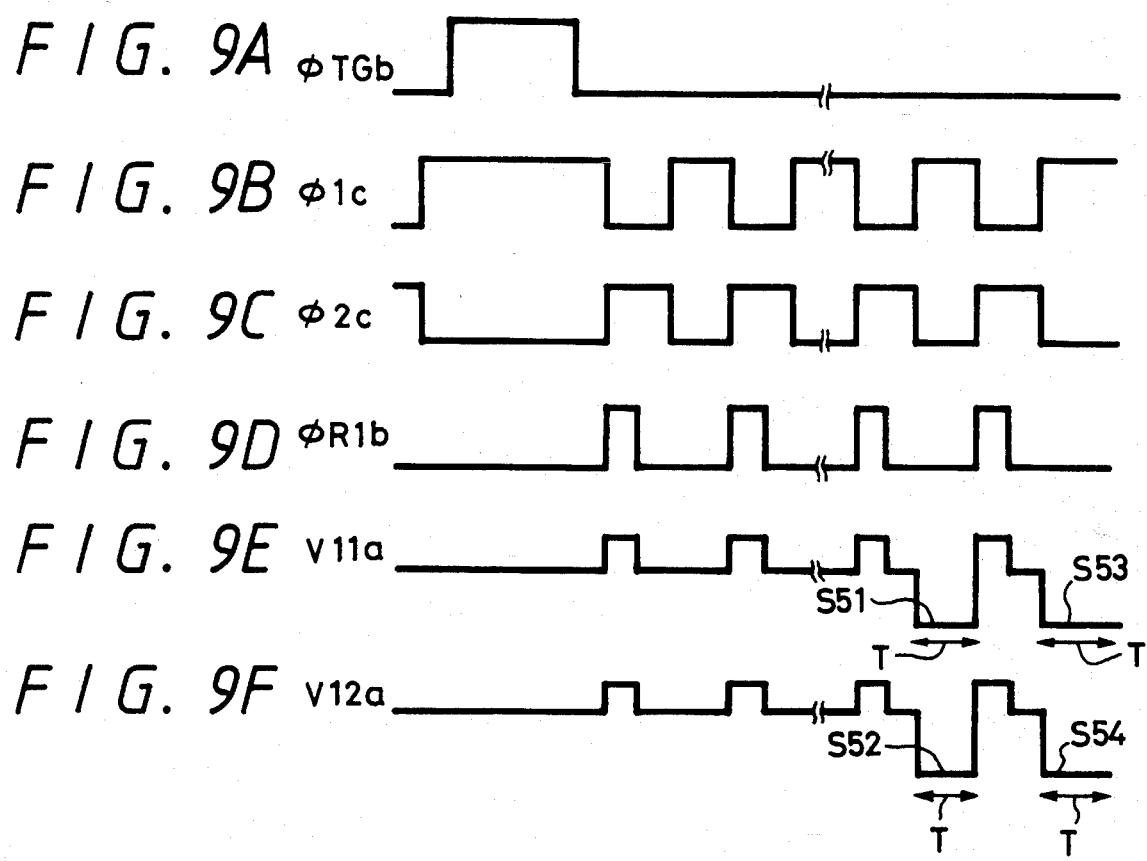
FIGS. 9A through 9F are timing charts illustrative of the manner in which the CCD linear sensor shown in FIG. 8 operates.

Operation of the CCD linear sensor 101 shown in FIG. 8 will be described below with reference to FIGS. 9A through 9F and 10, When a readout gate pulse $\phi TGb$ corresponding to a line clock signal shown in FIG. 9A is supplied through the input terminal 122 to the readout gate electrode, electric charges Q1a, Q2a, ... (see FIG. 10) stored in the photoelectric transducer elements P (POb=P1b, P3b, ..., PEb=P2b, P4b, ...) of the photosensor 123 are transferred at once to the corresponding registers of the CCD registers 120, 125 as indicated by the arrows.

More specifically, the electric charges Q1a, Q3a, ... stored in the odd-numbered photoelectric transducer elements P1b, P3b, ... are transferred respectively to the registers 120d, 120f, ..., and the electric charges Q2a, Q4a, ... stored in the even-numbered photoelectric transducer elements P2b, P4b, ... are transferred respectively to the registers 125d, 125f ...

When the two-phase transfer clock signals $\phi 1c$, $\phi 2c$ shown in FIGS. 9B and 9C are then supplied to the registers of the CCD registers 120, 125 through the input terminals 118, 127 and the input terminals 119, 126, the electric charges Q1a, Q3a, ... and the electric charges Q2a, Q4a, ... that are stored in the CCD registers 120, 125 are transferred successively to the floating diffusion regions 112, 113.

The transferred electric charges Q1a, Q2a, ... are converted by the floating diffusion regions 112, 113 into voltage signals, which are then sent through the buffers 106, 111 as two-phase output signals V11a, V12a (see FIGS. 9E and 9F) that are in phase with each other to the respective output terminals 105, 110. In FIGS. 9E and 9F, the signals which correspond to the electric charges Q1a, Q3a, ... are indicated by S51, S53, ..., respectively, and the signals which correspond to the electric charges Q2a, Q4a, ... are indicated by S52, S54, ..., respectively.

Figure 10:
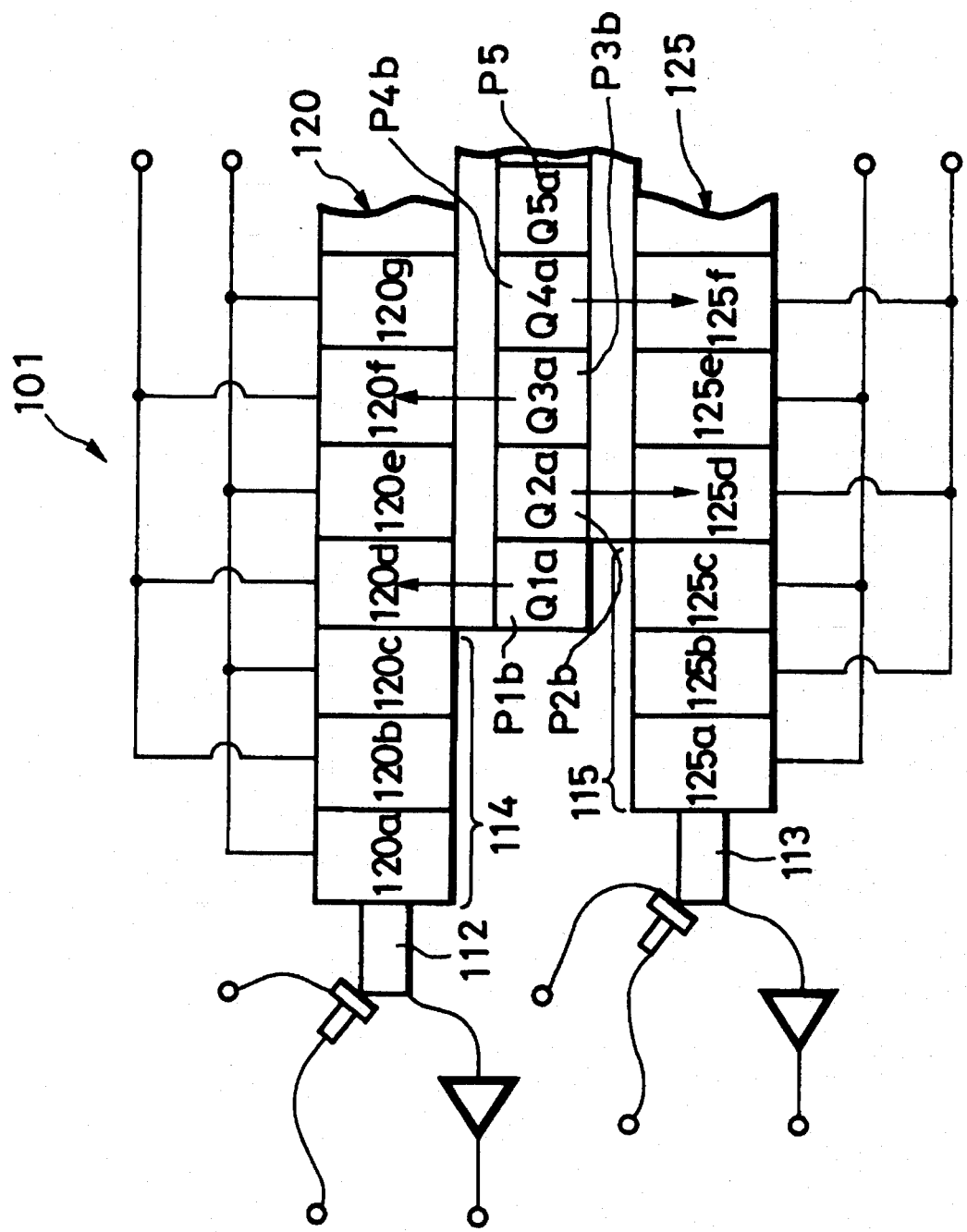
FIG. 10 is a fragmentary block diagram illustrative of the manner in which the CCD linear sensor shown in FIG. 8 operates.

The two-phase output signals V11a, V12a are in phase with each other because the CCD registers 120, 125 have the same number (3) of registers 120a~120c, 125a~125c ranging downstream of the registers 120d, 125d that are supplied with the electric charges Q1a, Q2a transferred from the photosensor 2, to the floating diffusion regions 112, 113 (see FIG. 10).

In the CCD linear sensor 1 according to the comparative example shown in FIG. 1B, however, since the dummy registers 27, 28 have different numbers of registers, the output signals V1, V2 are produced in opposite phase with each other. In such an arrangement, as described above, the coupling-induced noise N is included in the signal periods T due to the negative-going edges of the reset gate pulses $\phi R1$, $\phi R2$.

When the reset gate pulses $\phi R1b$ which are identical with each other, as shown in FIG. 9D, are supplied from the input terminals 102, 107 to the gates of the respective FETs 104, 109, any electric charges that remain in the floating diffusion regions 112, 113 after the transferred electric charges are converted by the floating diffusion regions 112, 113 into voltage signals are drained from the drains of the FETs 104, 109 to the input terminals 103a, 103b.

As can be understood from FIGS. 9A through 9F, the reset gate pulses $\phi R1b$ may be generated between charge transfers, i.e., between a signal period T and a next signal period T (see FIG. 9E, for example). Therefore, the transitions, i.e., the negative-going edges of the reset gate pulses $\phi R1b$ are located outside of the signal periods T. No noise caused due to the transitions of the reset gate pulses $\phi R1b$ are thus included in the signal periods T. Consequently, even if the clock signals have a shorter period, i.e., are generated at a higher frequency and at a higher speed, no noise is produced in the signal periods T of the output signals V11, V12.

Figure 11:
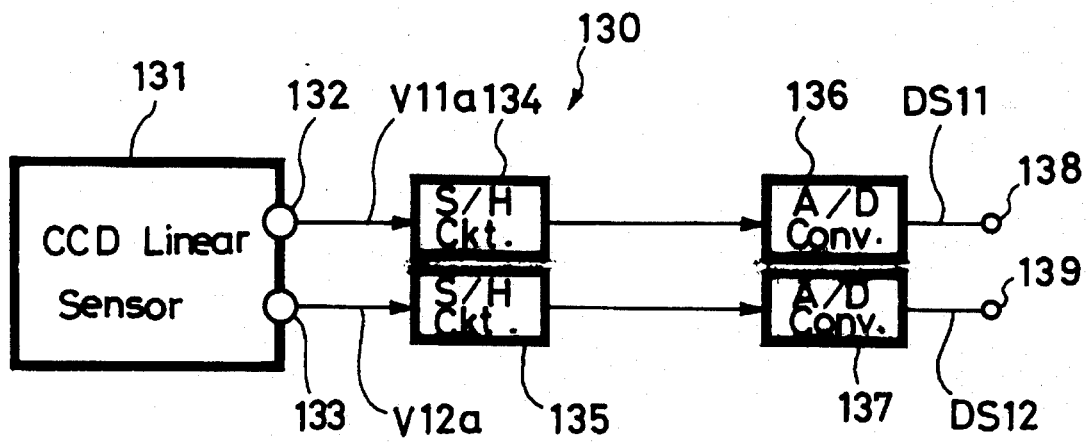
FIG. 11 is a block diagram of a CCD linear sensor as a solid-state imaging device and a signal processing circuit connected thereto according to a fourth embodiment of the present invention.
Figure 12:
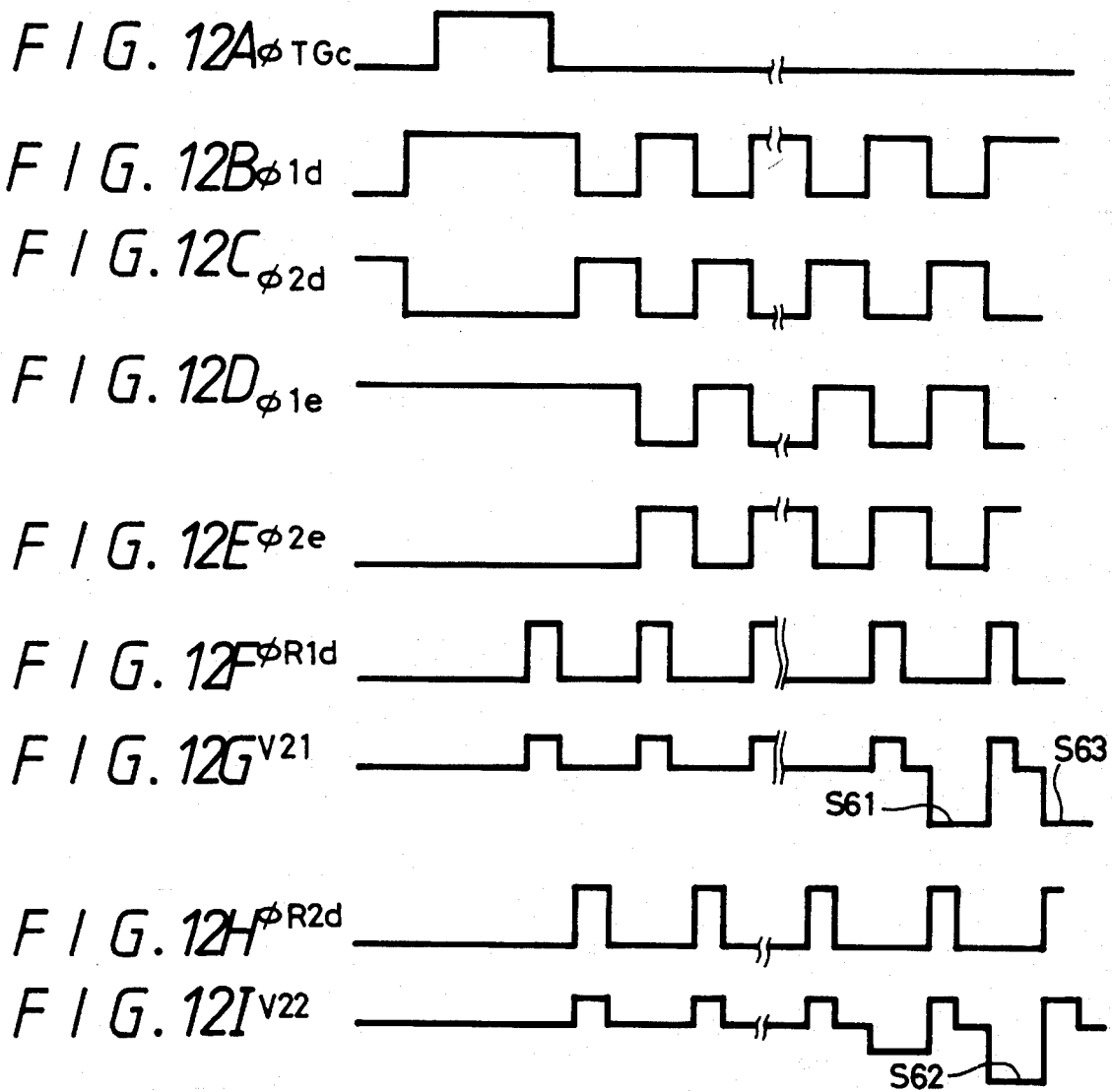
FIGS. 12A through 12I are timing charts illustrative of the manner in which an arrangement shown in FIG. 13 operates.

FIG. 11 shows in block form a CCD linear sensor 131 as a solid-state imaging device and a signal processing circuit 130 connected thereto according to a fourth embodiment of the present invention. The CCD linear sensor 131 is identical to the CCD linear sensor 101 shown in FIG. 8.

In FIG. 11, output signals V11a, V12a including signals S having signal periods T are supplied from respective output terminals 132, 133 of the CCD linear sensor 131 to respective sample and hold circuits 134, 135. The output signals V11a, V12a supplied to the sample and hold circuits 134, 135 are sampled and held thereby. The sampled and held signals are then converted into respective digital signals DS11, DS12 by respective A/D converters 136, 137 that are connected to the output terminals of the respective sample and hold circuits 134, 135. The digital signals DS11, DS12 are then supplied to respective output terminals 138, 139 for use by an external device. The circuit arrangement shown in FIG. 11 is capable of processing parallel signals at a high frequency and at a high speed.

In the above third and fourth embodiments, the CCD registers 120, 125 have the same number of dummy registers 114, 115, so that output signals V11a, V12a which are in phase with each other can be produced from the floating diffusion regions 112, 113.

Inasmuch as the output signals V11, V12 are in phase with each other, the signal periods T and the negative-going edges, i.e., the transitions, of the reset gate pulses $\phi R1b$ are separate in time from each other, preventing coupling-induced noise from being included in the signal periods T.

Therefore, the clock signals can be generated at a higher frequency and at a higher speed, making it possible to process the image signals at a higher frequency and at a higher speed.

As a result, the signal waveforms during the signal periods T are rendered flat. When the flat signal waveforms are sampled and held, the sampled and held signals are free of noise. Accordingly, images, for example, produced by processing the noise-free signals are of high quality.

Figure 13:
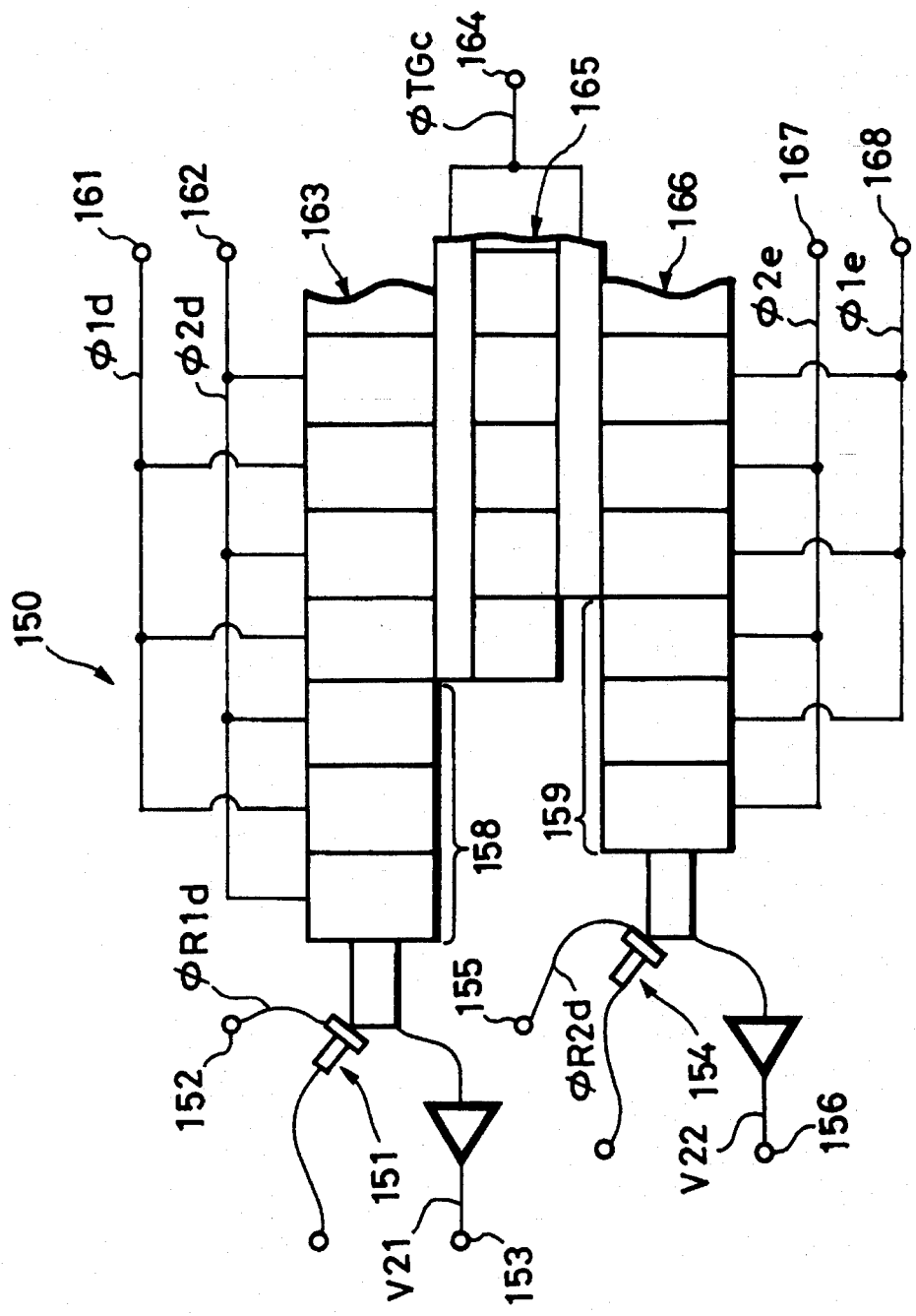
FIG. 13 is a fragmentary block diagram of an arrangement for supplying clock signals to produce two output signals that are in opposite phase with each other in the CCD linear sensor shown in FIG. 8.

If the CCD linear sensor 101 shown in FIG. 8 is to be employed for outputting two-phase output signals that are in opposite phase with other, clock signals shown in the timing charts of FIGS. 12A through 12I may be supplied to the input terminals as shown in FIG. 13.

More specifically, as shown in FIG. 13, input terminals 161, 162 of a CCD register 163 are supplied with respective clock signals φ1d, φ2d (see FIGS. 12B and 12C), and input terminals 168, 167 of a CCD register 166 are supplied with respective clock signals φ1e, φ2e (see FIGS. 12D and 12e) that are a half period (0.5 bit) shifted from the clock signals φ1d, φ2d. Input terminals 152, 155 connected to the gates of respective FETs 151, 154 are supplied with reset gate pulses φR1d, φR2d (see FIGS. 12F and 12H). When the input terminals are supplied with these clock pulses and reset gate pulses, output terminals 153, 156 produce two-phase output signals V21, V22 that are in opposite phase with each other.

While the present invention is incorporated in a CCD linear sensor in the above embodiments, the principles of the present invention are also applicable to a CCD area sensor.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A solid-state imaging device comprising:

a photosensor having a plurality of photoelectric transducer elements;

a first charge transfer device comprising a plurality of charge transfer elements in communication with said photosensor, for transferring a first set of electric charges from odd-numbered photoelectric transducer elements of said photosensor to a first signal converter for converting said first set of electric charges into a first output signal in response to a first clock signal and a second transfer clock signal which are in opposite phase with each other, said first transfer clock signal being in communication with odd-numbered charge transfer elements of said first charge transfer device, and said second transfer clock being in communication with even-numbered charge transfer elements of said first charge transfer device;

a second charge transfer device comprising a plurality of charge transfer elements in communication with said photosensor, for transferring a second set of electric charges from even-numbered photoelectric transducer elements of said photosensor to a second signal converter for converting said second set of electric charges into a second output signal that is in phase with said first output signal in response to a third transfer clock signal and a fourth transfer clock signal which are in opposite phase with each other, said third transfer clock signal being in communication with even-numbered charge transfer elements of said second charge transfer device and said fourth transfer clock signal being in communication with odd-numbered charge transfer elements of said second charge transfer device, wherein said first transfer clock signal and said third transfer clock signal are in opposite phase with each other, and said second transfer clock signal and said fourth transfer clock signal are in opposite phase with each other;

means for supplying a first reset signal to said first signal converter, wherein any remaining electric charges of said first set of electric charges are drained from said first signal converter in response to said first reset signal; and means for supplying a second reset signal to said second signal converter, said first reset signal and said second reset signal being in phase with each other, wherein any remaining electric charges of said second set of electric charges are drained from said second signal converter in response to said second reset signal, wherein said first reset signal occurs separate in time from a period of said first output signal, and wherein said second reset signal occurs separate in time from a period of said second output signal.

2. A solid-state imaging device comprising:

a photosensor having a plurality of photoelectric transducer elements;

a first charge transfer device having first dummy charge transfer elements on an output end thereof, for transferring a first set of electric charges supplied from odd-numbered photo-electric transducer elements of said photosensor to said first dummy charge transfer elements;

a second charge transfer device having as many second dummy charge transfer elements on an output end thereof as the number of said first dummy charge transfer elements, for transferring a second set of electric charges supplied from even-numbered photo-electric transducer elements of said photosensor to said second dummy charge transfer elements;

a first signal converter for converting said first set of electric charges supplied from said first dummy charge transfer elements into a first output signal;

a second signal converter for converting said second set of electric charges supplied from said second dummy charge transfer elements into a second output signal which is in phase with said first output signal;

means for supplying a first reset signal to said first signal converter, wherein any remaining electric charges of said first set of electric charges are drained from said first signal converter in response to said first reset signal; and means for supplying a second reset signal to said second signal converter, said first reset signal and said second reset signal being in phase with each other, wherein any remaining electric charges of said second set of electric charges are drained from said second signal converter in response to said second reset signal, wherein said first reset signal occurs separate in time from said first output signal, and wherein said second reset signal occurs separate in time from said second output signal.

3. A solid-state imaging device according to claim 2, wherein each of said first and second charge transfer devices has three dummy charge transfer elements.

4. A solid-state imaging device according to claim 2, wherein said first and second dummy charge transfer elements comprise charge transfer elements for providing a black reference.

* * * * *